(12) United States Patent
Whillock et al.

(10) Patent No.: US 8,718,334 B2
(45) Date of Patent: May 6, 2014

(54) SYSTEM FOR BIOMETRIC HAND ANALYSIS

(75) Inventors: Rand P. Whillock, North Oaks, MN (US); George Kilgore, Colorado Springs, CO (US)

(73) Assignee: Honeywell International Inc., Morristown, NJ (US)

( * ) Notice: Subject to any disclaimer, the term of this patent is extended or adjusted under 35 U.S.C. 154(b) by 294 days.

(21) Appl. No.: 13/101,872

(22) Filed: May 5, 2011

(65) Prior Publication Data

US 2012/0281884 A1    Nov. 8, 2012

(51) Int. Cl.
*G06K 9/00*    (2006.01)

(52) U.S. Cl.
USPC ......................................................... 382/115

(58) Field of Classification Search
None
See application file for complete search history.

(56) References Cited

U.S. PATENT DOCUMENTS

| | | | |
|---|---|---|---|
| 8,230,367 B2 * | 7/2012 | Bell et al. | 715/863 |
| 2006/0122939 A1 * | 6/2006 | Cohen et al. | 705/59 |
| 2012/0070070 A1 * | 3/2012 | Litvak | 382/154 |

* cited by examiner

*Primary Examiner* — Vikkram Bali
(74) *Attorney, Agent, or Firm* — Schwegman, Lundberg & Woessner, P.A.

(57) ABSTRACT

A system includes an image sensing device that is configured to receive a digital image of a human hand, and a range sensing device that is configured to receive range data relating a distance from the range sensing device to a plurality of points on the human hand. The system uses the range data to generate a range map of the human hand, normalizes a pose of the image of the human hand using the range data and the image, extracts one or more features of the hand from the normalized pose, and stores the extracted features into a computer storage medium.

17 Claims, 4 Drawing Sheets

SYSTEM FOR BIOMETRIC HAND ANALYSIS

TECHNICAL FIELD

The present disclosure relates to a system for biometric hand analysis.

BACKGROUND

Many applications could benefit from an accurate identification or verification of a person at a distance from a sensor. Hand geometry, based on measurements of features of the hand, is a useful biometric, but acquisition from a distance is problematic. One problem relates to accounting for the variations in the position and angle of the hand when held in free space rather than when it is placed on a flat sensor (as is normally done in hand geometric operations). Hand and finger orientation can also throw off reliable measurements.

DETAILED DESCRIPTION

Current hand analysis systems require the hand to be presented and inserted onto or into a measurement device in a flat orientation. These systems then measure features of the hand and fingers such as lengths and widths at various points on the hand and fingers. In contrast, in an embodiment of the present disclosure, a system measures and analyzes the geometry of a human hand or hands and its/their fingers and thumbs captured in a scene at standoff ranges. The range information is used to transform a hand randomly positioned in three dimensional space into a flat orientation. Thereafter, feature measurements can be done as if the hand was placed on a flat plane. A principal advantage of the embodiments of this disclosure is the ability to perform comparable biometric measurements of the hand at standoff ranges with minimal subject cooperation.

One or more embodiments identify the presence of one or more human hands in a camera's field of view, and proceed first to measure and analyze the closest hand. The subject's other hand can then be analyzed and measured, and/or another subject's hand or hands can be isolated, measured, and analyzed.

An embodiment uses a visible camera or other sensing device to capture an image of, or other data relating to, a human hand from a distance, and further uses a range mapping sensor to estimate the orientations of the hand and fingers in space. Other sensing devices that could be used include infrared, near infrared, long wave infrared, and ultraviolet devices. The range mapping sensor provides a range cloud or map of the distance to a number of points across the scene. The visible image is then corrected for pose using information from the range map, and identification features can then be extracted from the pose corrected visible image. The extracted features can be used for identity enrollment, identification, and verification by storing the features in a database, matching the features against pre-stored features of known people, or matching the features against a probe feature template presented for verification.

Embodiments of the present disclosure may be employed as a standalone biometric identity management system or operate in conjunction with other security and/or biometric identity management devices and systems.

Figure 1:
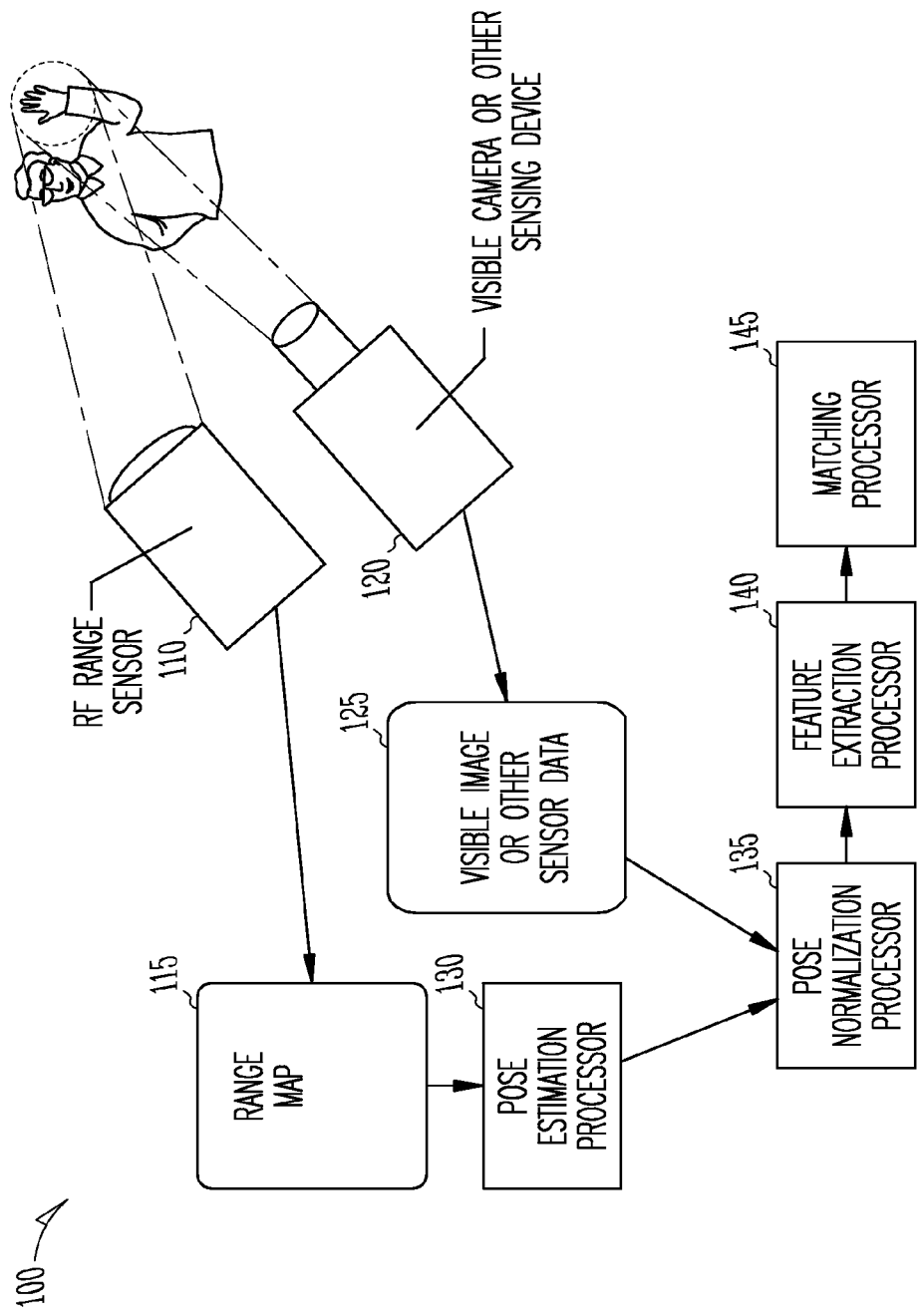
FIG. 1 is a block diagram of an example embodiment of a system for biometric hand analysis.

FIG. 1 illustrates an example embodiment of a standoff hand geometry biometric acquisition system 100. A range sensor 110 acquires a range map 115 of a hand, while a visible camera or other sensor device 120 acquires a visible image or other sensor data 125 of the hand. In an embodiment, these sensors could be pointed toward the hand region by a subsystem that first detects a person in the field of view, and then detects one or more hands of that person.

The range map 115 is used by the pose estimation module or processor 130 to determine the orientation of the hand and each of the fingers. The pose normalization module or processor 135 uses the pose estimation to do model-based geometric transformations on the visible image to move the hand and the fingers into a standard flat position. This transformation is invariant for some image characteristics (such as some finger width/length ratios) and corrupts other image characteristics which are unnecessary for hand geometry measurement (such as distances between different fingers).

The feature extraction module or processor 140 extracts numeric features from the invariant characteristics in the transformed visible image. The matching module or processor 145 uses the extracted features to match against a database of known people, or to match against a single template provided for verification.

Some of the sensors that could provide the range map include a time of flight imaging camera, a light detection and ranging (LIDAR) scanner, or a radio frequency (RF) based range map sensor. The range map could also be derived using stereo cameras. The ranges that work best would depend on the resolution of the range mapping sensor. The sensor resolution should be sufficient to resolve multiple points on an individual finger at the desired range.

In an embodiment, three image processing operations are required to transform the hand image into a normalized orientation. The first operation accounts for tilt of the hand with respect to the image sensor plane. The second operation translates and rotates the hand to the "fingers up" position. The third operation minimizes the "curl" of bent fingers to bring fingers to their maximally extended position. The parameters guiding these operations can all be readily computed using information from the range map.

Figure 2:
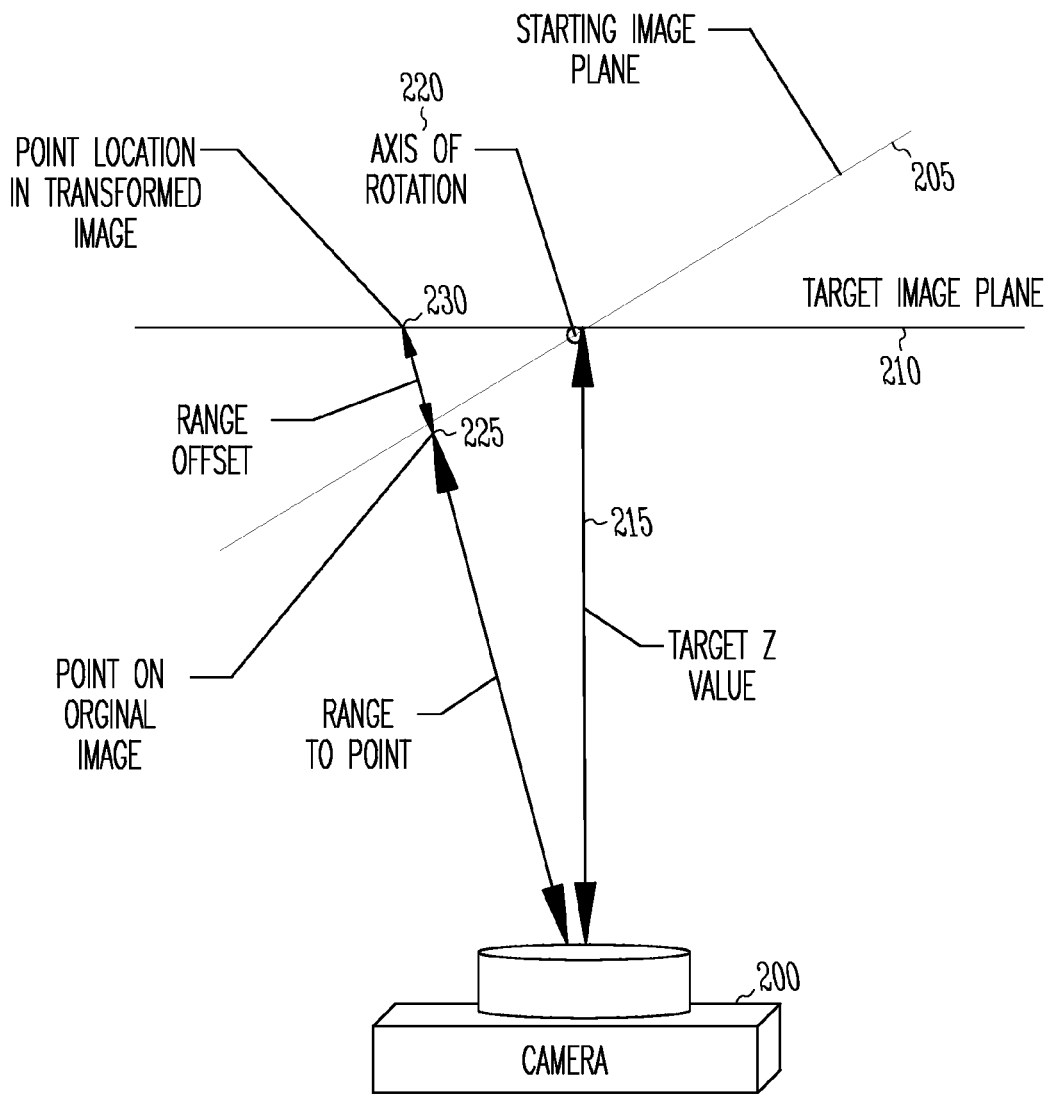
FIG. 2 is a diagram illustrating a transformation of a point on an original image to a target image using a range offset.

Referring to FIG. 2, a goal of translating a hand image to a normalized orientation is to transform the image of the hand from an arbitrary orientation to a normalized orientation parallel to the image sensor 200. The original orientation of the hand is defined by a plane that intersects as many of the range points on the hand as possible, hereafter referred to as the "starting hand image plane", and which is identified at 205 in FIG. 2. It can be visualized as a glass plate placed against the hand in space. The purpose of this normalization step is to transform the image on the starting hand plane to a "target hand image plane" 210 that is parallel to the image sensor plane.

The first step in this operation is to determine the target Z value 215 that defines the "target hand plane" range to which all of the hand image points in the image will be transformed. This value is determined by using the range map to find the average of the range values for each pixel in the hand image. Using this average value minimizes the transformation that will be done for all pixels across the hand.

The next step is to find the line at the intersection between the starting hand image plane and the calculated "target hand image plane". This line forms the axis of rotation 220 that is the pivot of the rotation required to transform the starting hand image plane parallel to the sensor image plane. This axis is determined by starting with a central point on the hand in the "starting hand image plane", and fitting a line through it that minimizes the difference between hand image range points in the "starting hand image plane" 205 and the target Z value 215.

The next step is to transform each point in the starting hand image to its location in the "target hand image". This is done by applying a rotational transform around the axis of rotation 220, based on the offset between the range value at the point and the target Z value 215. FIG. 2 shows this transformation at 225 and 230. If the range map is more sparse than the image resolution (which will be the case for many range sensors), the range for any particular image point may have to be interpolated from a nearby neighborhood of range values. Depending on the amount of transformation required there may be gaps or pixels in the target image that do not have values. These values can be filled in (interpolated) by averaging over a small neighborhood of points around each of the valueless points.

For some hand geometry feature calculations it may be useful to bring the hand image into a normalized "fingers up" position. The "fingers up" position is defined as that orientation in which the hand's index finger is in a reference vertical position. If this is desired, a two dimensional rotational transform can be applied to rotate points around the centroid of the hand to get them properly oriented.

It may also be necessary to accommodate some degree of bent or curled fingers. This requires the use of a reference three dimensional model of the hand and the finger's movable joints. Joint orientation parameters for the model would be set based on an analysis of the locations for each of the fingers in the original hand image. The range values then would be used to map points in the original hand image onto the three dimensional hand model, and the model would be manipulated to straighten the fingers. This manipulation consists of rotational transforms around the axis of each finger joint as specified by the model.

Figure 3A:
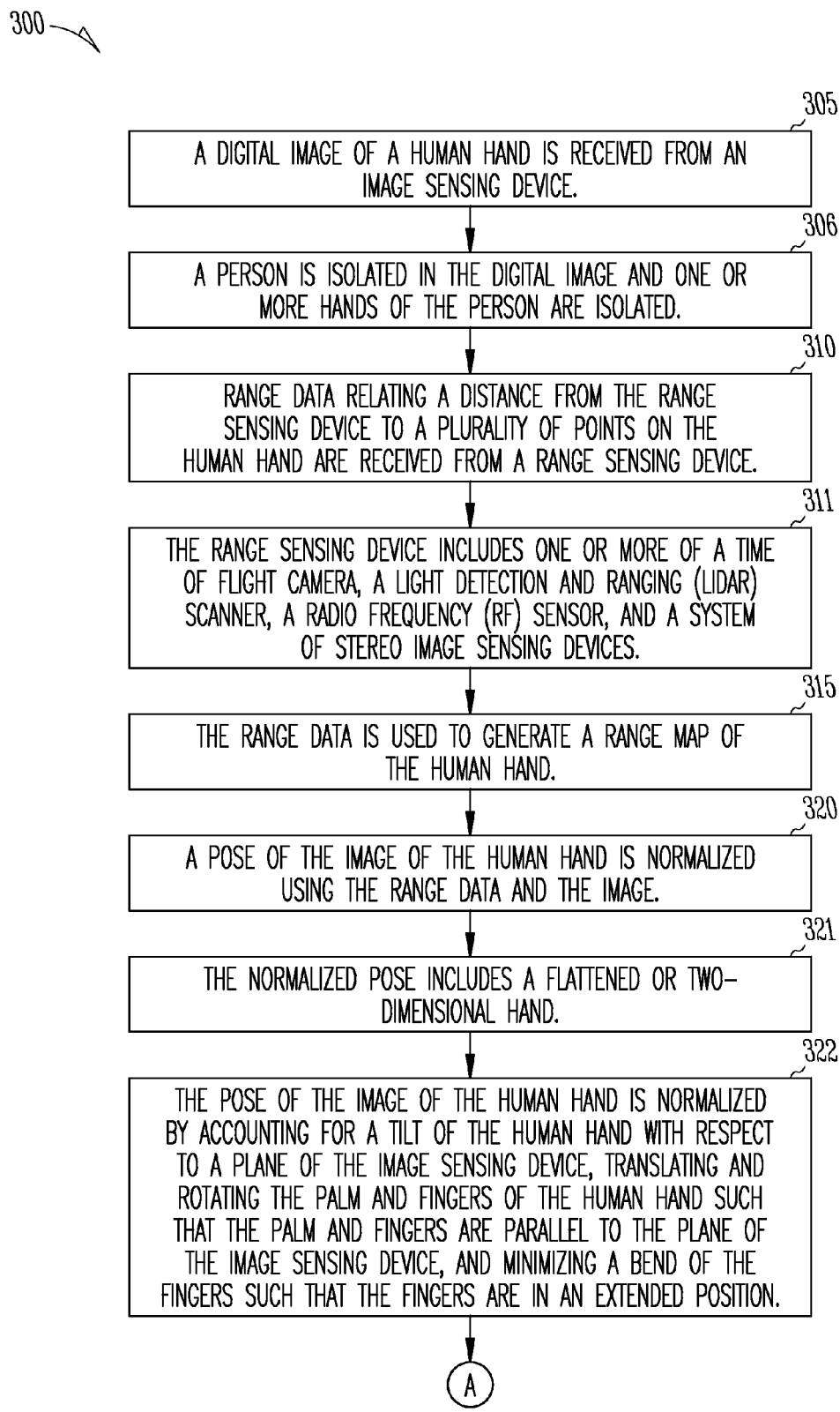
FIGS. 3A and 3B are a flowchart of an example embodiment of a process for biometric hand analysis.
Figure 3B:
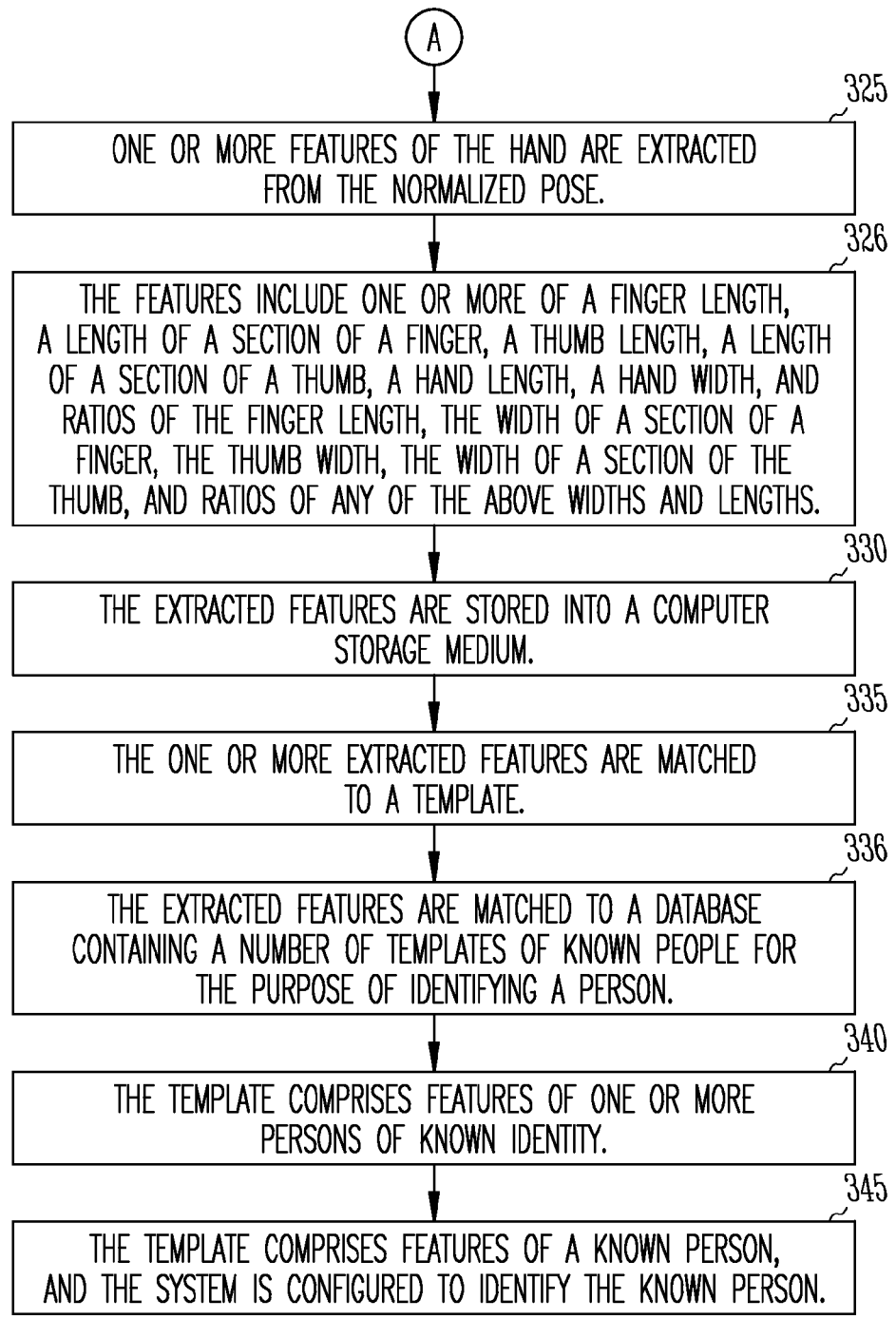

FIGS. 3A and 3B are a flowchart of an example process 300 for biometrically analyzing a hand. FIGS. 3A and 3B include a number of process blocks 305-345. Though arranged serially in the example of FIGS. 3A and 3B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 3A and 3B, at 305, a digital image of a human hand is received from an image sensing device. In an embodiment, at 306, a person is isolated in the digital image, and one or more hands of the person are isolated. At 310, range data relating a distance from a range sensing device to a plurality of points on the human hand are received from the range sensing device. At 311, the range sensing device includes one or more of a time of flight camera, a light detection and ranging (LIDAR) scanner, a radio frequency (RF) sensor, and a system of stereo image sensing devices. At 315, the range data is used to generate a range map of the human hand. At 320, a pose of the image of the human hand is normalized using the range data and the image. At 321, the normalized pose includes a flattened or two-dimensional hand. At 322, the pose of the image of the human hand is normalized by accounting for a tilt of the human hand with respect to a plane of the image sensing device, translating and rotating the palm and fingers of the human hand such that the palm and fingers are parallel to the plane of the image sensing device, and minimizing a bend of the fingers such that the fingers are in an extended position. At 325, one or more features of the hand are extracted from the normalized pose. At 326, the features include one or more of a finger length, a length of a section of a finger, a thumb length, a length of a section of a thumb, a hand length, a hand width, and ratios of the finger length, the width of a section of a finger, the thumb width, the width of a section of the thumb, and ratios of any of the above widths and lengths. At 330, the extracted features are stored into a computer storage medium.

At 335, the one or more extracted features are matched to a template. At 336, the extracted features are matched to a database containing a number of templates of known people for the purpose of identifying a person. At 340, the template comprises features of one or more persons of known identity. At 345, the template comprises features of a known person, and the system is configured to identify the known person.

Example Embodiments

Example No. 1 is a system including one or more computer processors configured to receive from an image sensing device a digital image of a human hand; receive from a range sensing device range data relating a distance from the range sensing device to a plurality of points on the human hand; use the range data to generate a range map of the human hand; normalize a pose of the image of the human hand using the range data and the image; extract one or more features of the hand from the normalized pose; and store the extracted features into a computer storage medium.

Example No. 2 includes the features of Example No. 1 and optionally includes one or more computer processors configured to match the one or more extracted features to a template.

Example No. 3 includes the features of Example Nos. 1-2 and optionally includes a system wherein the template comprises features of one or more persons of known identity.

Example No. 4 includes the features of Example Nos. 1-3 and optionally includes a system wherein the template comprises features of a known person, and the system is configured to identify the known person.

Example No. 5 includes the features of Example Nos. 1-4 and optionally includes a system wherein the extracted features are matched to a database containing a number of templates of known people for the purpose of identifying a person.

Example No. 6 includes the features of Example Nos. 1-5 and optionally includes the image sensing device.

Example No. 7 includes the features of Example Nos. 1-6 and optionally includes the range sensing device.

Example No. 8 includes the features of Example Nos. 1-7 and optionally includes a system wherein the range sensing device comprises one or more of a time of flight camera, a light detection and ranging (LIDAR) scanner, a radio frequency (RF) sensor, and a system of stereo image sensing devices.

Example No. 9 includes the features of Example Nos. 1-8 and optionally includes a system wherein the one or more computer processors are configured to isolate a person in the digital image, and to isolate one or more hands of the person.

Example No. 10 includes the features of Example Nos. 1-9 and optionally includes a system wherein the features include one or more of a finger length, a length of a section of a finger, a thumb length, a length of a section of a thumb, a hand length, a hand width, and ratios of the finger length, the width of a section of a finger, the thumb width, the width of a section of the thumb, and ratios of any of the above widths and lengths.

Example No. 11 includes the features of Example Nos. 1-10 and optionally includes a system wherein the normalized pose comprises a flattened or two-dimensional hand.

Example No. 12 includes the features of Example Nos. 1-11 and optionally includes one or more computer processors configured to normalize the pose of the image of the human hand by accounting for a tilt of the human hand with respect to a plane of the image sensing device; translating and rotating the palm and fingers of the human hand such that the palm and fingers are parallel to the plane of the image sensing device; and minimizing a bend of the fingers such that the fingers are in an extended position.

Example No. 13 is a process comprising receiving from an image sensing device a digital image of a human hand; receiving from a range sensing device range data relating a distance from the range sensing device to a plurality of points on the human hand; using the range data to generate a range map of the human hand; normalizing a pose of the image of the human hand using the range data and the image; extracting one or more features of the hand from the normalized pose; and storing the extracted features into a computer storage medium.

Example No. 14 includes the features of Example No. 13, and optionally includes matching the one or more extracted features to a template; wherein the template comprises features of one or more persons of known identity, or the template comprises features of a known person and the known person is identified.

Example No. 15 includes the feature of Example Nos. 13-14, and optionally includes matching the extracted features to a database containing a number of templates of known people for the purpose of identifying a person.

Example No. 16 includes the features of Example Nos. 13-15 and optionally includes isolating a person in the digital image, and isolating one or more hands of the person.

Example No. 17 includes the features of Example Nos. 13-16 and optionally includes a process wherein the features include one or more of a finger length, a length of a section of a finger, a thumb length, a length of a section of a thumb, a hand length, a hand width, and ratios of the finger length, the width of a section of a finger, the thumb width, the width of a section of the thumb, and ratios of any of the above widths and lengths.

Example No. 18 includes the features of Example Nos. 13-17 and optionally includes a process wherein the normalizing the pose of the image of the human hand comprises accounting for a tilt of the human hand with respect to a plane of the image sensing device; translating and rotating the palm and fingers of the human hand such that the palm and fingers are parallel to the plane of the image sensing device; and minimizing a bend of the fingers such that the fingers are in an extended position.

Example No. 19 is a non-transitory computer readable medium comprising instructions that when executed by a processor execute a process comprising receiving from an image sensing device a digital image of a human hand; receiving from a range sensing device range data relating a distance from the range sensing device to a plurality of points on the human hand; using the range data to generate a range map of the human hand; normalizing a pose of the image of the human hand using the range data and the image; extracting one or more features of the hand from the normalized pose; and storing the extracted features into a computer storage medium.

Example No. 20 includes all the features of Example No. 19 and optionally includes instructions for accounting for a tilt of the human hand with respect to a plane of the image sensing device; translating and rotating the palm and fingers of the human hand such that the palm and fingers are parallel to the plane of the image sensing device; and minimizing a bend of the fingers such that the fingers are in an extended position.

Thus, an example system, method and machine readable medium for biometric hand analysis have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The invention claimed is:

1. A system comprising:
one or more computer processors configured to:
receive from an image sensing device a digital image of a human hand;
receive from a range sensing device range data relating a distance from the range sensing device to a plurality of points on the human hand;
use the range data to generate a range map of the human hand;

normalize a pose of the image of the human hand using the range data and the image;

extract one or more features of the hand from the normalized pose; and store the extracted features into a computer storage medium;

wherein the one or more computer processors are configured to normalize the pose of the image of the human hand by:

accounting for a tilt of the human hand with respect to a plane of the image sensing device;

translating and rotating the palm and fingers of the human hand such that the palm and fingers are parallel to the plane of the image sensing device; and minimizing a bend of the fingers such that the fingers are in an extended position.

2. The system of claim 1, comprising one or more computer processors configured to match the one or more extracted features to a template.

3. The system of claim 2, wherein the template comprises features of one or more persons of known identity.

4. The system of claim 2, wherein the template comprises features of a known person, and the system is configured to identify the known person.

5. The system of claim 1, wherein the extracted features are matched to a database containing a number of templates of known people for the purpose of identifying a person.

6. The system of claim 1, comprising the image sensing device.

7. The system of claim 1, comprising the range sensing device.

8. The system of claim 6, wherein the range sensing device comprises one or more of a time of flight camera, a light detection and ranging (LIDAR) scanner, a radio frequency (RF) sensor, and a system of stereo image sensing devices.

9. The system of claim 1, wherein the one or more computer processors are configured to isolate a person in the digital image, and to isolate one or more hands of the person.

10. The system of claim 1, wherein the features include one or more of a finger length, a length of a section of a finger, a thumb length, a length of a section of a thumb, a hand length, a hand width, and ratios of the finger length, the width of a section of a finger, the thumb width, the width of a section of the thumb, and ratios of any of the above widths and lengths.

11. The system of claim 1, wherein the normalized pose comprises a flattened or two-dimensional hand.

12. A process comprising:

receiving from an image sensing device a digital image of a human hand;

receiving from a range sensing device range data relating a distance from the range sensing device to a plurality of points on the human hand;

using the range data to generate a range map of the human hand;

normalizing a pose of the image of the human hand using the range data and the image;

extracting one or more features of the hand from the normalized pose; and storing the extracted features into a computer storage medium;

wherein the normalizing the pose of the image of the human hand comprises:

accounting for a tilt of the human hand with respect to a plane of the image sensing device;

translating and rotating the palm and fingers of the human hand such that the palm and fingers are parallel to the plane of the image sensing device; and minimizing a bend of the fingers such that the fingers are in an extended position.

13. The process of claim 12, comprising matching the one or more extracted features to a template; wherein the template comprises features of one or more persons of known identity, or the template comprises features of a known person and the known person is identified.

14. The process of claim 12, comprising matching the extracted features to a database containing a number of templates of known people for the purpose of identifying a person.

15. The process of claim 12, comprising isolating a person in the digital image, and isolating one or more hands of the person.

16. The process of claim 12, wherein the features include one or more of a finger length, a length of a section of a finger, a thumb length, a length of a section of a thumb, a hand length, a hand width, and ratios of the finger length, the width of a section of a finger, the thumb width, the width of a section of the thumb, and ratios of any of the above widths and lengths.

17. A non-transitory computer readable medium comprising instructions that when executed by a processor execute a process comprising:

receiving from an image sensing device a digital image of a human hand;

receiving from a range sensing device range data relating a distance from the range sensing device to a plurality of points on the human hand;

using the range data to generate a range map of the human hand;

normalizing a pose of the image of the human hand using the range data and the image;

extracting one or more features of the hand from the normalized pose;

storing the extracted features into a computer storage medium;

accounting for a tilt of the human hand with respect to a plane of the image sensing device;

translating and rotating the palm and fingers of the human hand such that the palm and fingers are parallel to the plane of the image sensing device; and minimizing a bend of the fingers such that the fingers are in an extended position.

* * * * *

UNITED STATES PATENT AND TRADEMARK OFFICE
CERTIFICATE OF CORRECTION

PATENT NO. : 8,718,334 B2
APPLICATION NO. : 13/101872
DATED : May 6, 2014
INVENTOR(S) : Whillock et al.

It is certified that error appears in the above-identified patent and that said Letters Patent is hereby corrected as shown below:

In the Claims

In column 7, line 33, in Claim 8, delete "claim 6," and insert --claim 7,--, therefor Signed and Sealed this
Sixteenth Day of December, 2014

Michelle K. Lee
*Deputy Director of the United States Patent and Trademark Office*